W. P. GORDON.
TIRE.
APPLICATION FILED FEB. 8, 1919.
1,334,448.
Patented Mar. 23, 1920.
2 SHEETS—SHEET 2.
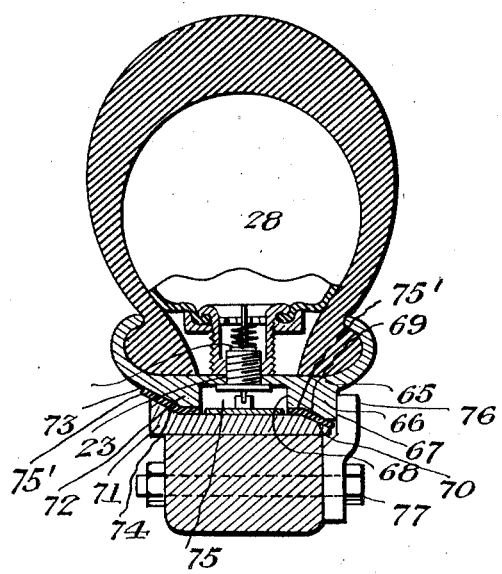
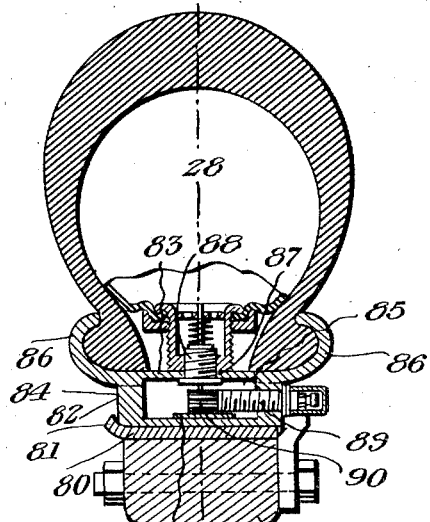
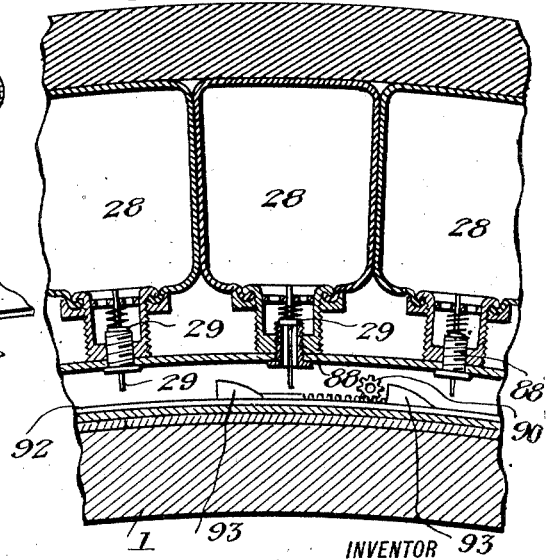
WITNESSES:
INVENTOR
W. P. Gordon
BY
ATTORNEY

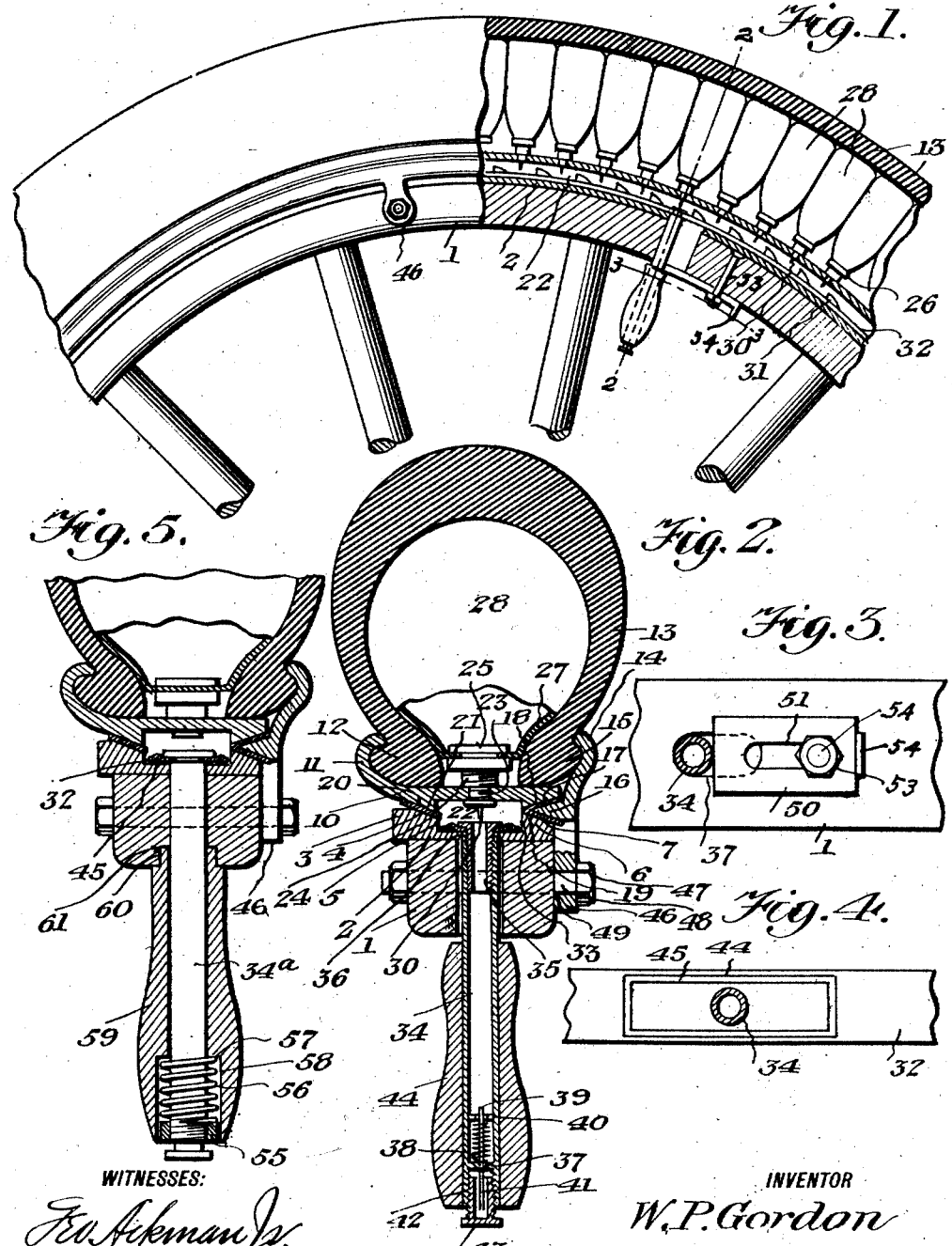

UNITED STATES PATENT OFFICE.

WILEY P. GORDON, OF TARBORO, NORTH CAROLINA, ASSIGNOR OF ONE-HALF TO THOMAS B. JACOCKS, OF TARBORO, NORTH CAROLINA.

TIRE.

1,334,448.  Specification of Letters Patent.  Patented Mar. 23, 1920.

Application filed February 8, 1919. Serial No. 275,800.

*To all whom it may concern:*

Be it known that I, WILEY P. GORDON, a citizen of the United States, residing at Tarboro, in the county of Edgecombe and State of North Carolina, have invented new and useful Improvements in Tires, of which the following is a specification.

This invention relates to improvements in tire construction and is an improvement upon an abandoned application filed by me Oct. 9, 1912, Serial Number 724,796, and allowed March 3, 1913.

An object of the invention is to provide a plurality of closely associated bodies or cells between the shoe and the rim of the wheel, which are adapted to contain an equal pressure of air, so as to maintain a properly inflated condition of the tire, designing said bodies, whereby one or any number thereof may be quickly removed from or connected with the wheel, and, further, arranging the bodies within the casing, whereby they may be readily inflated or deflated, as the occasion may demand.

Another object of the invention is to provide a rim and a felly band, which may be associated and spaced relatively whereby to define therebetween an air conduit with which the irrespective air cells may establish direct communication during the inflation of the tire.

A further object of the invention is to provide means for effectively sealing the side joints between the rims and the felly band, so as to render the conduit air and moisture tight.

A still further object of the invention is to provide an adjustable clencher ring, which will be formed as an integral part of the clamping wedge between the rim and the felly band, so that when the ring is adjusted to clamping or unclamping position corresponding adjustment of the wedge element will be made.

A still further object of the invention is to provide a rim, which can be readily removed from the wheel, so that the different cell valves may be exposed for repair.

Another object of the invention is to provide the valves with stems, which will extend into the conduit of the wheel, and which will be disposed within the path of movable means which may be manually adjusted whereby to simultaneously adjust the stems when it is desired to deflate or inflate the cells.

A still further object of the invention is to provide a controlling element for the valve adjusting means which may be connected with a pump or suitable source of air supply, whereby air may be conducted to the conduit and then distributed to the respective air cells.

With these and other objects in view, the invention consists of certain novel features of construction, combination and arrangement of parts, as will be hereinafter described and claimed.

In the accompanying drawings:

Figure 1 is a side view of a portion of a wheel with parts in section.

Fig. 2 is a section on the line 2—2 of Fig. 1.

Fig. 3 is a section on the line 3—3 of Fig. 1.

Fig. 4 is a plan view of a portion of the valve controlling element.

Fig. 5 is a view similar to Fig. 2 showing a slightly modified form of the invention.

Fig. 6 is an enlarged transverse sectional view showing a modified form of rim construction.

Fig. 7 is a view similar to Fig. 6, showing a further modified form.

Fig. 8 is a sectional view on the line 8—8 of Fig. 7.

Fig. 9 is a detail perspective view of the valve tube used in connection with the construction shown in Figs. 7 and 8.

Fig. 10 is a detail perspective view of a portion of the valve stem opening member.

The wheel comprises a felly 1, which is circumferentially embraced by a felly band 2. This band may be shrunk onto the felly, or it may be secured thereto in any obvious well known manner. Said band is provided at one side with an enlarged portion 3, having an outwardly tapered annular shoulder 4 thereon, while at a point inwardly of said shoulder the band is provided with a radial annular stop, or channel defining portion 5. At the other side the band is provided with an enlarged portion 6, on which is formed a downwardly and outwardly inclined shoulder 7.

The tire rim 10 is provided at its side outward of the enlarged portion 3 of the felly band 2 with a flange 11, which is adapted to receive the flange 12 of the tire shoe 13. This shoe may be of the well known construction. A clencher ring 14 is adjustable with relation to the outer side edge of the rim 10 and is adapted for clamping engagement with the flange 15 of the tire shoe. Said clencher ring is provided inwardly of the rim 10 with an integral annular clamping element 16 of wedge form in transverse section, as shown in Fig. 2. An inclined shoulder 17 on the underside of the rim 10 is disposed in outwardly diverging relation to the shoulder 7 of the ring 6. Said shoulder 17 has a fiber gasket 18 secured thereto, while the shoulder 7 of the ring 6 supports a similar gasket 19. The gaskets 18 and 19 are adapted to yieldingly engage against the tapered inner and outer surface of the wedge clamping element 16, whereby the air and moisture proof joint is formed at this point. A similar beveled surface 20 on the inner side of the rim 10 is adapted to bear against a sealing gasket 21 on the surface 4, whereby the air and moisture proof connection is formed at this point of the wheel. The felly band and the rim 10 are spaced intermediate of their sides, so as to define therebetween a continuous annular conduit 22.

The rim 10 is provided with threaded radially disposed passages 23, in which are secured correspondingly threaded valve casings 24. These casing extend into the inflated space of the tire, and as shown each casing is provided with relatively adjustable clamping portions 25 and 26, between which the neck 27 of an inflatable cell forming member 28 is engaged. The valve casings 24 are provided with yieldable valves 29, which open into the air containing cells. These valves are provided with stems, 30, which extend into the air conduit 22, where they are disposed directly in the path of substantial cam surfaces 31 of a valve controlling element 32. The element 32 is preferably in the form of a continuous band, which embraces an intermediate portion of the felly band 2. The element is adapted for adjustment circumferentially of the felly band, and as illustrated, it is interposed between the shoulder 5 thereof and a similar shoulder 33 of the ring 6.

A hollow actuating tube 34 is connected with the valve adjusting element through the medium of a hollow screw 35. Said tube extends through an elongated slot 36 in the felly band and through a similar slot 37 in the felly 1. At one end the tube is provided with an integral valve seat 37, against which is normally seated a valve 38, and this valve is adapted to open inwardly, and as shown it is provided with a portion 39, which slides in a spider 40 within the tube and a portion 41, which extends slightly beyond the adjacent end of the tube for a purpose to be hereinafter explained. An integral thread 42 of the tube is adapted to receive a removable closing cap 43, whereby the valve will be protected from foreign matter and moisture. A hand grip 44 of the tube is adapted to be actuated manually, whereby the element 32 may be adjusted circumferentially of the felly band 2, so as to bring the cam surfaces 31 into the required position. The element 32 is provided with a substantially rectangular concavity 44, in which is secured a correspondingly formed gasket 45. This gasket engages against the felly band at points adjacent to the opening 36 therein, so as to seal the joint between the band and the adjusting element and thereby positively prevent leakage.

Integral radial ears 46 on the wedge shaped clamping element 16 extend against one side of the felly 1, and as shown said ears receive transverse clamping bolts 47, which are adjustable through the felly. Rectangular portions 48 of said bolts are engaged in fixed correspondingly shaped sockets 49 in the felly, so that the bolts will be secured against rotation. From the construction named, it is evident that the adjustment of the bolts 47 can be quickly made, so as to bring the flange 14 and the wedge portion 16 of the clencher ring into clamping or released position, as the occasion may demand.

Now that the details of construction of the device are clearly disclosed, it is said that the tube which may extend from a pump, or suitable air source (not shown) may be fitted to the intake end of the tube 34, so that air may be forced by the valve 34 and conducted to the conduit 22 and then finally distributed into the different air cells 28 until the tire is placed under the desired pressure. Should the valves 24 of the tire rim 10 need repair, the bolts 47 may be adjusted, so as to release the flange 14 from the outer tube of the tire and to also release the wedge portion 16 from the tire rim and from the rim 6. The shoe may then be conveniently removed. The tire rim 10 may be drawn laterally off of the wheel, and in this manner the valves will be exposed for convenient manipulation and repair.

A latch plate 50 is slidably mounted upon the felly 1 and is adapted to engage against the tube 34, whereby to hold the latter against movement. Said latch plate is provided with an elongated slot 51, which receives a stud bolt 52, which extends from the felly. This bolt carries an adjusting nut 53, which is adapted to bear against the plate to hold the same against sliding adjustment. A manipulating extension 54 of said plate is adapted to be engaged by the hand of the operator, whereby the plate can be adjusted to a position to permit the tubes 32 to be moved in a position necessary to effect open adjustment of the valve stems of the inflatable cells.

In the modified form of the invention shown in Fig. 5, the actuating tube 34ª is provided at one end with a nut 55, and as shown, the tube is embraced by a spring 56, which bears at one end against the nut and at its opposite end against a shoulder 57 of a socket 58 in the handle 59. The handle is provided with a reduced portion 60, which is normally extended into a socket 61 in the felly 1ª under the action of the spring 56. The handle is thereby adapted for longitudinal adjustments on the tube 34ª, whereby the portion 60 of said handle may be retracted from the recess 61 and thereby permit the handle to be rocked circumferentially of the felly when it is desired to effect adjustments of the valve controlling ring 32.

In Fig. 6, there is shown a modified form of rim and means for securing the same to the wheel. This construction comprises a rim 65 which may be formed to receive either tires of the clencher type or straight side, the former being illustrated. The rim 65 is provided with spaced threaded openings 23ª for the reception of the valves of the separate cell sections 28. One edge of the rim is formed with an annular flange 66, whose outer face is relatively wider than the inner face, providing a wide edge 67 and a narrow edge 68, which are connected by an inclined surface 69. This flange is receivable within a seat 70, formed in the adjacent edge of the felly band 71. The opposite edge of the rim 65 is provided with an annular flange 72, whose outer face is beveled, as shown at 73, while the adjacent edge of the felly band is provided with a beveled rib 74 for coöperation therewith. This spaces the rim 65 from the felly 71, so as to provide an air chamber, or conduit, 75, and to make this chamber air tight there is provided between the lug 66 and the seat 70 and the meeting faces of the lugs 72 and 74, a packing 75 of asbestos, or other similar material.

The rim 65 is held in position through the medium of a latch 76, which is pivotally mounted upon a bolt 77 which extends through the wheel felly.

In Figs. 7 to 10, inclusive, there is illustrated a different form of the invention, and although this form is shown as a modification, it is to be understood that this is the preferred form of the invention. In this construction, the felly band 80 is provided with an outwardly turned inner edge 81 and a rim 82 surrounds this band and rests against this edge. The rim 82 is formed of concentrically arranged spaced walls 83, which are disposed around the circumference of the wheel and provide side walls, which are connected at each end by annular end walls 84, these walls forming an annular air chamber or conduit 85. The side and end walls 83 and 84 may be welded, or otherwise secured together, so as to provide a closed annular conduit from which air leakage is prevented. The rim 82 is provided with the usual beads 86 for the reception of the tire casing or shoe.

The wall 83 of the conduit 85 is formed with spaced openings 87, for the reception of valve casings 88, which are substantially similar to the valve casings previously described and which house valves also of a similar character. As in the previous form of the invention, these valves serve to establish and cut off communication between the annular chamber or conduit and the interior of the separate air cells 28.

Instead of extending the valve tube through the felly 1, there is provided a valve tube 89, which extends from one of the side walls 84 to the conduit or chamber 85 and carries at its inner end a pinion 90, which engages a rack 91, carried by a valve operating element 92, similar to the element 32, previously described. The element 82 is provided with cams 93, which engage the stems of the valves 29, which are contained in the valve casings 88. Thus, by rotating the valve tube 89, the element 92 may be moved circumferentially of the chamber or conduit 85, to bring the cams 93 in operative engagement with the stems of the valves 29, to open the latter and deflate the air cells 28.

The invention is susceptible of various changes in its form, proportions and minor details of construction and the right is herein reserved to make such changes as properly fall within the scope of the appended claims.

Having described the invention, what is claimed is:

1. A structure of the class described comprising a rim having a conduit, a tire embracing the rim and including cells having valves extending into the conduit, a valve tube movably mounted upon the rim and opening into the conduit and a valve opening member connected with the tube and having portions presentable to the valve stems to lift the latter on adjustment of the tube to one position.

2. A structure of the class described comprising a rim formed of annular side walls spaced concentrically around the felly of a wheel, spaced annular end walls extending from each end of and joining the side walls to provide an annular air-tight conduit, a tire embracing the rim and including cells having valve stems extending into the conduit, a valve tube movably mounted upon said rim and opening into the conduit and a valve opening member connected to the tube, whereby said valve stems may be lifted to deflate the tire.

3. A structure of the class described comprising a rim formed of annular side walls spaced concentrically around the felly of a wheel, spaced annular end walls extending from each end of and adjoining the side walls to provide an annular air-tight conduit, a tire embracing the rim and including cells having valve stems extending into the conduit, a valve tube extending from the interior of the conduit for inflating the tire, a valve opening member movable circumferentially with the conduit and means carried by the valve tube and engageable with the valve opening member for lifting the valve stems to deflate the tire.

In testimony whereof I affix my signature.

WILEY P. GORDON.